United States Patent [19]
Sikdar et al.

[11] Patent Number: 5,809,035
[45] Date of Patent: Sep. 15, 1998

[54] METHOD AND APPARATUS TO APPLY PRIORITIZATION POLICY IN ELECTRONIC SYSTEMS

[75] Inventors: Som Sikdar, San Jose; Steven Strong, Fremont; Tor Sundsbarm, San Jose; Santosh Lolayekar, Sunnyvale, all of Calif.

[73] Assignee: ShomitiSystems, San Jose, Calif.

[21] Appl. No.: 677,058

[22] Filed: Jul. 9, 1996

[51] Int. Cl.$^6$ ...................................................... G06F 11/00
[52] U.S. Cl. .............................................................. 371/21.1
[58] Field of Search ................................. 371/21.1, 21.3, 371/21.8; 395/182.03, 200, 823

[56] References Cited

U.S. PATENT DOCUMENTS 5,708,779  1/1998  Graziano et al. ........................ 395/200

*Primary Examiner*—Vincent P. Canney
*Attorney, Agent, or Firm*—Mark A. Haynes; Wilson, Sonsini, Goodrich & Rosati

[57] ABSTRACT

The present invention provides method of encoding an electronic memory; multiple digital values are prioritized; respective digital values are associated with respective memory locations of the electronic memory such that there are multiple memory locations each associated with two or more different digital values; and respective digital values are loaded into respective memory locations of the electronic memory in order from lowest priority digital value to highest priority digital value wherein each respective digital value is loaded into all respective memory locations that are associated with such respective digital value.

34 Claims, 3 Drawing Sheets

| 11 | 10 | 01 | 00 |
|---|---|---|---|
| A3 | A3 | A3 | A3 |

FIG. 2A

| 11 | 10 | 01 | 00 |
|---|---|---|---|
| A2 | A2 | A3 | A3 |

FIG. 2B

| 11 | 10 | 01 | 00 |
|---|---|---|---|
| A1 | A2 | A1 | A3 |

FIG. 2C

| 11 | 10 | 01 | 00 |
|---|---|---|---|
| A3 | A3 | A3 | A3 |

FIG. 3A

| 11 | 10 | 01 | 00 |
|---|---|---|---|
| A1 | A3 | A1 | A3 |

FIG. 3B

| 11 | 10 | 01 | 00 |
|---|---|---|---|
| A2 | A2 | A1 | A3 |

FIG. 3C

METHOD AND APPARATUS TO APPLY PRIORITIZATION POLICY IN ELECTRONIC SYSTEMS

BACKGROUND OF THE INVENTION

1. Field of the Invention

The invention relates to the control of decision making in electronic systems based upon evaluations of multiple prioritized conditions.

2. Description of the Related Art

The prioritization of multiple actions, functions or processes is inherent, and therefore, pervasive in electronic information processing. For example, while electronically processing information, it may be necessary to evaluate numerous conditions in order to select among different actions to be performed or among different program branches be executed. Complex selection criteria can, for instance, impose a significant burden on a processing device performing such an evaluation.

Network analysis and management technologies, for example, often must prioritize multiple actions, functions or processes based upon complex conditions. This prioritization must occur rapidly enough to keep pace with the data rate. For instance, in network and communication systems digital information is commonly provided in streams and packets transmitted between communicating nodes. It may, for example, be necessary to observe a stream of digital information and to apply a policy for selecting a portion of the stream based upon observation of digital information in the stream and the evaluation of a set of conditions based upon the observed digital information. Applying such a policy may involve prioritization of the evaluated conditions. Ideally, the complexity of the selection criteria should not materially affect the time required for such observation, evaluation and selection regardless of the data rate.

For example, a network router may observe a packet stream received on one of its ports and may identify certain keywords in received packet(s). It then may use the keywords to evaluate a set of conditions in order to determine which of its output ports to use for output of the received packet. The determination of which router port is to output the packets may involve a prioritization of the evaluated conditions. This prioritization may constitute a policy for the selection of a router output port, or more generally, may constitute a routing algorithm for a network router.

Network analysis tools are software and hardware based products that monitor network operations and diagnose communication problems. A typical protocol analyzer, for instance, is a network analysis tool which in essence applies a set of filters to a packet stream transmitted on a network and analyzes selected information identified during the filtering process. The volume of packetized digital information may be quite large since it may be the result of simultaneous communications among several nodes on the network. In protocol analyzers, for example, a set of capture filters are applied to the stream in order to identify and to "zoom" in on information of interest in the packet stream. This filtering, for example, may involve prioritization of information in the packet stream in order to ascertain which information to zoom in on for further analysis.

Often, prioritization policies such as those described above are implemented using computer software. For example, a processing unit may be programmed to evaluate a set of conditions and to select an action or a process based upon a prioritization policy. An advantage of software implementation of a prioritization policy is that the policy can be readily changed. For instance, a network analyzer might at first be programmed to observe TCP/IP traffic, and later may be programmed to observe Telnet traffic within the TCP/IP traffic, and after that, may be programmed to observe Telnet sessions within the TCP/IP traffic.

While earlier systems and methods for implementing prioritization policies applied to high speed digital information streams generally have been acceptable, there have been shortcomings with their use. For instance, in certain prior implementations prioritization policies are applied through computer software which includes a series of "if-then-else" type rule based programming statements. More particularly, for example, a policy may be implemented as follows:

```
if (condition1) then action1
esle if (condition2) then action2
else if (condition3) then action3
else if (condition1) AND (NOTcondition3) then action4
. . .else actionN.
```

It will be appreciated that the processing power required to implement the prioritization may depend upon the number and complexity of the conditions to be prioritized.

A network analyzer, for instance, may be programmed to identify network data of interest and to then zoom in on the identified data. For example, the network analyzer might be programmed to capture only Netware (TM) protocol traffic and to identify when a conversation begins between any of several particular nodes named AX, BX, CX or DX, for example. If the network analyzer identifies a Netware conversation between any two such nodes, such as between CX and DX, then the analyzer may be programmed to zoom in on that conversation by capturing NCP (Netware Core Protocol) traffic between those nodes. The start of a conversation between any of the identified nodes, therefore, represents a selection criterion for zooming in on a conversation between such nodes. Thus, the network analyzer capture filter is changed based upon conditions or selection criteria applied to the captured network data. Analyzing such conditions consumes processing device cycles. The more complex the conditions become, the more processing device cycles may be required to apply prioritization policy to such conditions. In the analysis of high speed network traffic, however, rapid processing is essential.

Thus, there is a need for an improved method and apparatus for applying selection criteria in electronic systems, especially in electronic systems used to analyze high data rate computer network traffic, for example. In particular, for instance, it is desirable that the complexity of a network analyzer filter not limit the rate of data analysis. The present invention meets this need.

SUMMARY OF THE INVENTION

The present invention permits a novel encoding an electronic memory. Multiple digital values that will encode the electronic memory are prioritized. The digital values, for example, may be associated with actions, functions or processes prioritized in accordance with the prioritization policy. The digital values are associated with memory locations of the electronic memory. Typically, there will be overlapping memory location assignments. More specifically, there will be multiple memory locations each associated with two or more digital values. The digital values are loaded into respective memory locations of the electronic memory in order from lowest priority digital value to highest priority digital value such that each respective digital value is loaded into all memory locations associated with it. For memory locations associated with more than one digital value, a lower priority digital value loaded earlier will be overwritten with higher priority digital value loaded later. The result of the encoding process is a novel electronic memory having a prioritized encoding of digital values.

In another aspect, the invention provides a method of using such an encoded memory device to implement a prioritization policy. Multiple test conditions are individually evaluated in order to determine which conditions are satisfied. In response to the evaluation, multiple electronic signals are provided which together indicate the highest priority test condition satisfied. Accessing A digital value is accessed from the memory location of the memory device associated with the highest priority satisfied test condition.

In yet another aspect, the invention provides a novel network protocol analyzer. The analyzer includes a network controller and an electronic memory that includes memory locations addressable via address signal lines and that has been encoded in accordance with a prioritization policy. The address signal lines of the electronic memory are associated with respective digital values and associated test conditions. The electronic memory stores respective digital mask information for each of multiple test conditions and also stores digital pattern information for each test condition. Test circuitry applies respective digital mask information and respective digital pattern information to respective captured digital network information. Test circuitry also produces multiple respective individual digital test condition state signals, each of which indicates a respective state of a different respective test condition in relation to the respective captured digital network information. Addressing circuitry produces an address signal combination in which individual respective address signal bits are associated with individual respective digital test condition state signals produced by the test circuitry. Each respective individual address bit is applied to a respective address signal line associated with a test condition corresponding to a respective digital test condition state signal associated with such bit.

In still another aspect, the invention provides a method for analyzing digital information captured from a source. A set of digital values are associated with a set of test conditions. The digital values and associated test conditions are prioritized. Digital values are associated with memory locations of an electronic memory such that there are multiple memory locations each associated with two or more different digital values. Digital values are loaded into respective memory locations of the electronic memory in order from lowest priority digital value to highest priority digital value. In particular, each respective digital value is loaded into all respective memory locations that are associated with such respective digital value. Multiple tests are performed on the captured information to determine which ones of the multiple test conditions are satisfied by the captured information. A multiple bit digital signal is produced that simultaneously indicates which test conditions are satisfied and which test conditions are not satisfied. The multiple bit signal is provided to the electronic memory as an address signal combination which accesses a memory location of the electronic memory that stores a highest priority test condition satisfied by the captured information.

These and other features and aspects of the invention will be better understood from the following detailed description and appended drawings.

BRIEF DESCRIPTION OF THE DRAWINGS

FIGS. 2A–2C provide a series of generalized bock diagrams illustrating steps in the encoding of an exemplary memory device with digital values based upon a first sample prioritization policy in accordance with a presently preferred embodiment of the invention;

FIGS. 3A–3C provide a series of generalized bock diagrams illustrating steps in the encoding of an exemplary memory device with digital values based upon a second sample prioritization policy in accordance with a presently preferred embodiment of the invention.

DESCRIPTION OF THE PREFERRED EMBODIMENTS

The present invention comprises a novel method and apparatus for applying a prioritization policy in an electronic system based upon evaluations of multiple conditions. The following description is presented to enable any person skilled in the art to make and use the invention. Descriptions of specific applications are provided only as examples. Various modifications to the preferred embodiments will be readily apparent to those skilled in the art, and the general principles defined herein may be applied to other embodiments and applications without departing from the spirit and scope of the invention. Thus, the present invention is not intended to be limited to the embodiments shown, but is to be accorded the widest scope consistent with the principles and features disclosed herein.

In a presently preferred embodiment of the invention, a memory device is loaded with digital information which represents a collection of actions, functions or processes that can be selected based upon a prioritization policy. Individual storage locations of the memory device may store individual digital values corresponding to the actions, functions or processes. The storage locations at which individual digital values are stored are selected in accordance with the prioritization policy.

Figure 1:
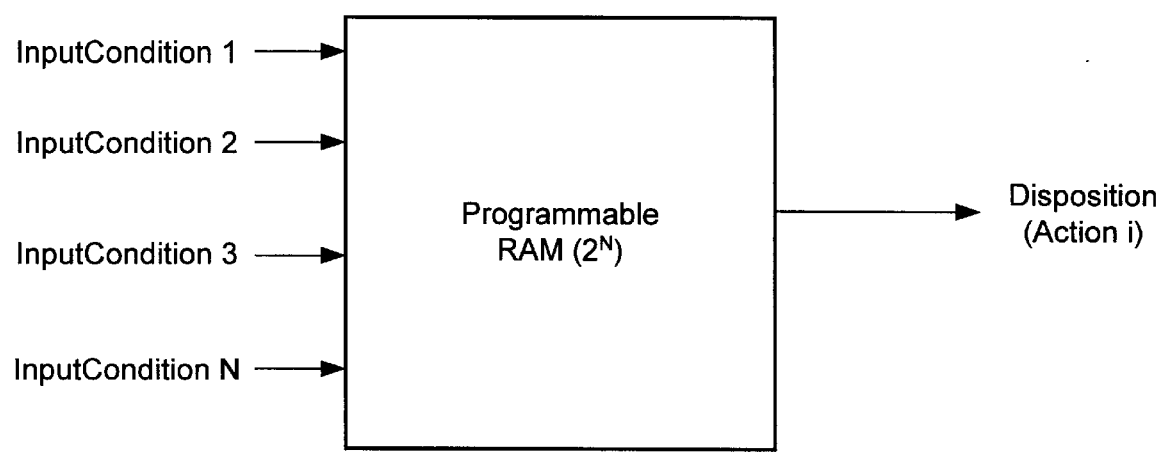
FIG. 1 is a generalized block diagram of a memory device encoded in accordance with a presently preferred embodiment of the invention so that digital values are stored based upon a prioritization policy such that individual address signal lines correspond to individual input conditions to be evaluated to implement the prioritization policy.

Referring to the illustrative drawing of FIG. 1 there is shown a generalized block diagram of a random access memory (RAM) device which can be used to prioritize a set of conditions in accordance with a presently preferred embodiment of the invention. The exemplary RAM has $2^N$ storage locations which can be addressed by providing an N-bit address signal via the N address lines. The RAM stores in its $2^N$ storage locations digital values that correspond to different actions. In accordance with a current implementation of the invention, each of the N address lines is associated with a condition that is evaluated to determine which action to select. Each different N-bit address combination retrieves digital information from a different storage location in accordance with a prioritization policy. A retrieved digital value, which represents the selected action, is output via the data lines.

More specifically, in a current implementation, the individual storage locations are selected such that individual bit positions in a multibit digital address combination used to address memory device locations are associated with individual conditions that are pre-evaluated as part of the prioritization. As a result of such prioritization-based storage, the relative states of multiple conditions can be tested simultaneously. Each address bit represents the state of an individual condition, and the multiple address bits together represent the states of multiple conditions. Different digital address signal combinations, therefore, represent different combinations of multiple condition states.

Later, for example, when the memory device is put to use in an electronic system, and a given set of multiple conditions states are found to exist, then the memory device can be addressed using an address signal combination that represents such multiple condition states. A pre-stored digital value will be retrieved from the memory device in response to the address signals. The retrieved digital value then can be employed in the electronic system to effect a desired action which meets the prioritization policy for the states of the multiple conditions. A detailed example of the use of such an encoded memory device in an electronic system is provide below in connection with a description of a presently preferred embodiment of a network protocol analyzer in accordance with an aspect of the invention.

Thus, the present invention advantageously organizes the storage of digital values in a memory device so as to efficiently implement a prioritization policy which selects an action based upon a plurality of prioritized conditions. The states of individual conditions, for example, may be evaluated based upon an analysis of network traffic. Such evaluation can involve on-line real-time analysis. Alternatively, it may involve storage of network traffic for later off-line analysis. Furthermore, although the current embodiment of the invention is illustrated in terms of a generalized RAM device, there are various types of memory devices that can be employed consistent with the invention, such as, PAL, interleaved RAM or even Disk, for example.

An exemplary generalized prioritization policy can be expressed in the following exemplary rule based form:

```
if (condition1) then Action1
else if (condition2) then Action2
else if (condition3) then Action3
...
else if (conditionM) then ActionM
else ActionM+1.
```

In the above generalized prioritization policy, Action1 has the highest priority, and ActionM+1 has the lowest priority. The states of condition1 to conditionM are evaluated in order to determine which action to select in accordance with the policy. Although the evaluation of conditions can be quite complex, those skilled in the art understand how to perform such evaluations which need not be described in detail herein. The invention involves the prioritization of actions based upon the set of evaluated conditions.

A process of encoding a memory device having N storage locations 0 to $2^N-1$ to effect the generalized prioritization policy expressed above, in accordance with a presently preferred embodiment of the invention, is described in pseudo computer programming language in the following algorithm:

```
for i = 0 to 2^N - 1 do
begin
    RAM(i) = Action_{M+1}
    for j = M down to 1 do
        if (evaluate(i, conditionj) is equal to true) then RAM(i)
        = Actionj
        end
end
```

The algorithm considers individual storage locations in order from storage location i=0 to storage location $i=2^N-1$. The algorithm initially causes a digital value for a default action, ActionM+1, to be stored in storage location i. Then, for that same storage location i, the algorithm works in ascending order from the next lowest priority actionj= ActionM, to the highest priority actionj=Action1. For each actionj, the algorithm stores in location i, the digital value for the actionj if a designated bit, taken from the address signal combination which addresses storage location i and which corresponds to conditionj (and/or actionj), signifies a "true" state or "condition satisfied" state, for that actionj. Note that during this process involving storage location i, the algorithm may cause a digital value for a higher priority action to overwrite a digital value for a lower priority action. The algorithm repeats the above process for each storage location i=0 through $i=2^N-1$.

Thus, in one aspect of a currently preferred implementation of the invention, individual digital values are loaded into a memory device in an order which depends upon the priority of individual conditions associated with such digital values. More specifically, digital values corresponding to lower priority conditions are loaded into the memory device before digital values corresponding to higher priority conditions. As a result, digital values loaded later may overwrite or replace digital values loaded earlier. In another aspect of such presently preferred embodiment, the memory device is addressed using a binary address combination which represents a composite of the evaluated results of multiple prioritized conditions. The address signal, therefore, represent a set of evaluated conditions, and an addressed storage location contains a digital value which represents the highest priority action in view of such set of evaluated conditions.

As a result, for instance, a process akin to multiple prioritized "if-then-else," rule based computer software statements can be performed by accessing a memory device to retrieve a single digital value stored using a prioritization policy in accordance with the invention. A processing unit, therefore, need not serially evaluate such a series of statements. Instead, a prioritization policy can be employed more efficiently by merely retrieving data from memory, without imposing the burden of executing a series of conditional "if-then-else" statements on a computer or other processing device.

In accordance with an alternative embodiment of the invention explained below with reference to FIGS. 2A–2C and 3A–3C, storage locations of a memory device are first loaded with digital values representative of actions, functions or processes that correspond to lower priority conditions and then are loaded with digital values representative of actions, functions or processes (hereinafter referred to as actions) that correspond to progressively higher priority conditions. In one current implementation of the invention, for example, multiple storage locations of a memory device are loaded with a first digital value associated with a first action associated with a lower priority condition. Next, all storage locations of the memory device corresponding to a positive evaluation of a second higher priority condition are loaded with a second digital value corresponding to a second action. This second level storage may result in the storage of a second digital value in a storage location where a first digital value previously had been stored. Next, all storage locations of the memory device corresponding to a positive evaluation of a third higher priority condition are loaded with a third digital value corresponding to a third action. This third level storage may result in the storage of a third digital value in a storage location where a first or a second digital value previously had been stored.

This progressive storage process continues until a digital value has been stored in the memory device for each priority action, even if values stored later overwrite some values stored earlier. A result of this process is a memory device in which multiple storage locations may be encoded with the same digital value. Such multiple locations correspond to multiple combinations of conditions for which a given prioritization policy would select an action that corresponds to such digital value.

FIGS. 2A–2C and 3A–3C illustrate steps involved in encoding a representative memory device in accordance with two different exemplary prioritization policies. Both exemplary prioritization policies involve the same conditions and the same actions. Only the prioritizations are different.

---

A first exemplary prioritization policy is:
    if InputCondition1 then Action1
    else if InputCondition2 then Action2
    else Action3
A second exemplary prioritization policy is:
    if InputCondition2 then Action2
    else if InputCondition1 then Action1
    else Action3.

---

Since in each case there are only two InputConditionj to be evaluated, the illustrative memory device is represented as only having two address input lines. Thus, the four possible address locations are 00, 01, 10 and 11. A first line IC1 corresponds to InputCondition1, and a second line IC2 corresponds to InputCondition2. When InputCondition1 is "true" a logical 1 is provided on IC1. When InputCondition1 is "false", a logical 0 is provided on IC1. Similarly, when InputCondition2 is "true" a logical 1 is provided on IC2. When InputCondition2 is "false", a logical 0 is provided on IC2. Note that although the examples in FIGS. 2–3, employ logical 1 to represent a "true" evaluation of a condition, it will be understood that the invention can be implemented with logical 0 representing a "true" evaluation of a condition.

The following table illustrates the correlation between input conditions and their bit positions in an address signal combination used to address the exemplary memory device of FIGS. 2 and 3.

| IC2 | IC1 |
|---|---|
| 0 | 0 |
| 0 | 1 |
| 1 | 0 |
| 1 | 1 |

Referring to the illustrative drawings of FIGS. 2A–2C, there is shown a series of stages in the loading of a memory device in accordance with the first sample priority set forth above. In FIG. 2A, all storage locations of the memory device initially are loaded with digital value A3 which corresponds to Action3. Thus, Action3 is a default value.

Next, in FIG. 2B, digital value A2 is loaded into any storage location that can be accessed when the bit position corresponding to IC2 in an address signal combination has a logical 1 value. These locations are 10 and 11. Note that certain of the A3 digital values are overwritten by the A2 digital values since InputCondition2 has a higher priority than InputCondition3. Finally, in FIG. 2C, digital value A1 is loaded into any storage location that can be accessed when the bit position corresponding to IC1 has a logical 1 value. These locations are 11 and 01. Note that certain of the A2 and A3 digital values are overwritten with A1 since InputCondition1 has a higher priority than either InputCondition2 or InputCondition3.

Referring to the illustrative drawings of FIGS. 3A–3C, there is shown a series of stages in the loading of a memory device in accordance with the second sample priority set forth above. In FIG. 3A, all storage locations of the memory device initially are loaded with digital value A3 which corresponds to Action3. Action3 is a default value. Next, in FIG. 3B, digital value A1 is loaded into any storage location that can be accessed when the bit position corresponding to IC1 has a logical 1 value. These locations are 01 and 11. Note that certain of the A3 digital values are overwritten by the A1 digital values since InputCondition1 has a higher priority than InputCondition3. Finally, in FIG. 3C, digital value A2 is loaded into any storage location that can be accessed when the bit position corresponding to IC2 has a logical 1 value. These locations are 10 and 11. Note that certain of the A1 and A3 digital values are overwritten with A2 since InputCondition2 has a higher priority than either InputCondition1 or InputCondition3.

Therefore, the memory device encoding of FIG. 2C comports with the first sample prioritization policy, and the memory device encoding of FIG. 3C comports with the second sample prioritization policy. Note that although the InputConditions and the Actions are the same for the first and second prioritization policies, their prioritization is different. Since the memory device is encoded differently for the different prioritizations, different digital values may be retrieved from the device of FIG. 2C on the one hand, and from the device of FIG. 3C on the other hand, in response to the same set of address signals.

The series of pseudo computer program language statements set forth below represent an illustrative sample prioritization policy which, for example, can be used by a network analyzer in accordance with the invention to decide which network packets to capture for analysis and which network packets to ignore. There are eight "if-then-else" type rule based statements plus a default statement. The statement labeled (1) is the highest priority statement. The statement labeled (8) is the lowest priority statement. The statement labeled (9) is the default statement.

(1) if the packet has a DA (destination address) "qrs" then capture the packet and increment a prescribed error counter
(2) else if, the packet is an IPX server advertisement protocol packet (SAP) AND the packet is from server "123" then capture the packet
(3) else if, the packet is an IP packet AND (the packet is from node "xyz" to server "ABC" OR the packet is from node "xyz" to node "DEF") then capture the packet
(4) else if, already have received ten IP packets then trigger/ disarm and do not capture the packet
(5) else if, the packet is an IP packet AND the packet is <512 bytes long then do not capture the packet
(6) else if, the packet is >1518 bytes long AND the packet is an IP packet then do not capture the packet (7) else if, the packet is an IP packet AND packet has a "do not fragment" flag set then do not capture the packet (8) else if, the packet is an IPX server advertisement protocol packet then do not capture the packet (9) else, capture the packet.

In a current implementation of the invention, a memory device is encoded with digital values corresponding to the actions set forth in each of the statements (1)–(9) in accordance with the prioritization implicit in the ordering of the statements. Each of the statements sets forth a condition(s) under which a particular action(s) may be selected. For the entire collection of prioritized conditions, only the highest priority statement that is satisfied will have its corresponding action(s) performed. For example if only the conditions set forth in statements (3) and (7) are satisfied, then the action specified in statement (3) is performed, i.e., the packet is captured. The conditions set forth in individual statements may be complex. For instance, statement (3) involves a both logical OR statement and a logical AND statement. Moreover, individual statements may specify multiple actions. For example, statement (1) specifies both the capture of a packet and the incrementing of an error counter.

As explained below with reference to the ActionRAM 414 in FIG. 4, each statement may be related to a particular bit position in address signal combinations used to address a memory device. For example, referring to the following table, the address signal bit positions for a memory device addressable with an eight bit address signal combination and the above eight (1)–(8) conditional statements may be related as follows.

| Bit Position: | 7 | 6 | 5 | 4 | 3 | 2 | 1 | 0 |
|---|---|---|---|---|---|---|---|---|
| Statement: | 1 | 2 | 3 | 4 | 5 | 6 | 7 | 8 |

Assuming, for example, that a logical 1 address bit indicates that the conditions set forth in a statement are satisfied and that a logical 0 address bit indicates that the conditions set forth in a statement are not satisfied, then an address signal combination 01000111 indicates that the conditions in statements (2), (6), (7) and (8) are satisfied and that the conditions in statements (1), (3), (4) and (5) are not satisfied.

The series of pseudo computer program statements set forth below represent another sample prioritization policy, for example, that can be used to change a filter to cause it to "zoom" in on certain network information. For instance, a filter may snoop for ICMP Redirect or IPX Retransmissions. These are protocol packets typically sent when there are problems in the network.

The prioritization may be as follows.

(1) if the packet is ICMP_Redirect, then look at ip only (2) else if, the packet is ipx_Retransmit, then look at IPX only (3) else, look at both ip and ipx Thus, based upon the outcome of the prioritization, the filter may be instructed, by instructions stored in prioritized order, to snoop for IP only, for IPX only or for both IP and IPX.

Figure 4:
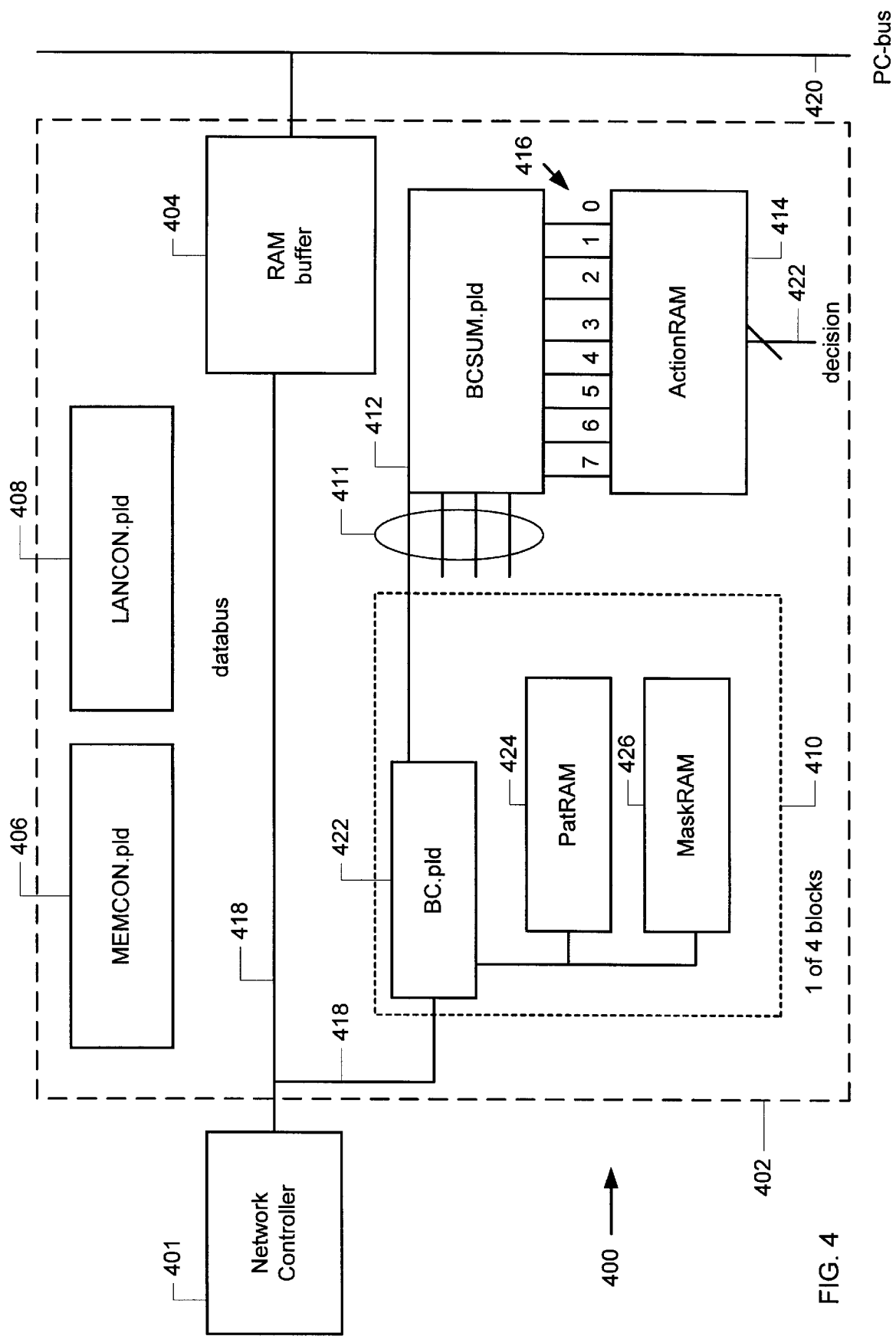
FIG. 4 is a block diagram of a network protocol analyzer in accordance with a presently preferred embodiment of the invention.

Referring to the illustrative drawing of FIG. 4, there is shown an electronic system according to a presently preferred embodiment of the invention. More specifically, there is shown a generalized block diagram of a network protocol analyzer 400 in accordance with a presently preferred embodiment of the invention. In the illustrated embodiment, the network protocol analyzer 400 is implemented as an IBM PC card which includes a network controller 401 along with a capture filter 402. The network controller 401 is connected to a high speed digital information network (not shown) such as a local area network (LAN) of computers. It captures digital information from the digital streams communicated over the network. The capture filter 402 evaluates the information captured by the network controller 401. The capture filter 402 is connected to a PC bus 420 which is part of a PC computer (not shown) which can be used for analysis of digital information captured from the network.

The capture filter 402 of the current embodiment includes a RAM buffer 404, a memory controller 406 and a LAN controller 408. The capture filter 402 also includes four logic blocks 410 (only one of the four is shown) which collectively operate to determine whether digital packets or other digital information received from the network via the network controller 401 meet whatever test conditions happen to be under evaluation. Each of the four respective logic blocks 410 is respectively connected to InputCondition logic 412 via lines 411. The InputCondition logic 412 is connected to an ActionRAM 414 via lines 416 which serve as address signal lines for the ActionRAM 414. The Action RAM 414 has output lines 422 which, in the current embodiment, serve as control signal lines and address signal lines. A databus 418 interconnects the network controller 401 with the RAM buffer 404 and with the logic blocks 410. The RAM buffer 404, in turn, is connected to the PC-bus 420.

In the current embodiment, the memory controller 406 and the LAN controller 408 are implemented using programmable logic devices. Each of the respective logic blocks 410 includes respective byte comparator logic 422, a respective PatternRAM 424 and a respective MaskRAM 426. In the presently preferred embodiment, the byte comparator logic 422, and the InputCondition logic 412 are implemented using programmable logic devices (PLDs), and the ActionRAM 414, the PatternRAM 424 and MaskRAM 426 are implemented as SRAM.

Alternatively, for example, capture filter 402 could be implemented using an application specific integrated circuit (ASIC). Although, current ASICS are expensive to design and build. Also, for instance, the capture filter could be implemented by programming a high speed microprocessor instead of using PLDs. Although, current microprocessors generally do not operate fast enough to handle data capture from very high speed networks.

The overall operation of the network protocol analyzer 400 is as follows. Digital information is captured from the network by the network controller 401. The network controller 401 provides the captured digital information to the RAM buffer 404 and to the four logic blocks 410 via the data bus 418. The logic blocks 410 operate as a unit to evaluate the captured information in view of a set of test conditions in order to determine what, if any, action may be required. The logic blocks 410 provide signals via lines 411 to the InputCondition logic 412 which, in response, generates address signals on lines 416 which address particular storage locations of the ActionRAM 414. The ActionRAM 414, in turn, provides digital output signals on lines 423 which specify the actions to be performed in response to the captured information. The RAM buffer 404 temporarily stores information captured by the network controller 401 for later analysis, for example.

A generalized example of an implementation of a prioritization policy using the network protocol analyzer 400 of the presently preferred embodiment is as follows. The logic blocks 410 are be encoded to evaluate digital information acquired by the network controller 401 against multiple input conditions and to provide on lines 411 signals indicative of the results of the multiple evaluations. The InputCondition logic 412 is encoded to respond to the signals on lines 411 by providing on lines 416 an address signal combination indicative of the states of the multiple conditions. The ActionRAM 414 is encoded, for example, such that the address signal combination accesses a storage location that contains a digital value associated with an action that satisfies the prioritization policy in view of the states of the multiple conditions. The accessed digital value is output on lines 422 in order to effect the action called for under the prioritization policy.

Thus, the logic blocks 410 serve as a filter which evaluates the acquired information in view of multiple test conditions and which provides signals indicative of the evaluation results. The InputCondution logic 412 processes these signals and provides an address signal combination indicative of the overall evaluation results. The Action RAM 414 responds to the address signal combination by outputting a digital value which satisfies a prioritization policy in view of the overall results of the evaluation of the multiple test conditions.

For example, in a current application, the network protocol analyzer 400 is implemented to evaluate packet traffic on a 100Mbit/sec Ethernet network. The network analyzer clock cycle is 40 nsec. Each packet is between 64 bytes and 1518 bytes long. Each longword in a given packet is accessed 32 bits at a time. Thus, 320 nsec are required to acquire a 32 bit byte, and the analyzer can execute eight (8) clock cycles per byte. All eight conditions (1)–(8) set forth in the first sample prioritization policy can be evaluated during the eight clock cycles required to acquire the next 32 bit longword in the packet.

More particularly, each of the four logic blocks receives a different 8 bit subset of each 32 bit byte. In order to perform the evaluation set forth in the first statement of the first sample prioritization policy set forth above labeled "(1)", for example, there is a prescribed 8 bit digital mask stored in MaskRAM 426 and a prescribed 8 bit pattern stored in PatternRAM 424 for each logic block 410. Of course, each of the four logic blocks generally use a respective different 8 bit mask and a respective different 8 bit pattern to process its assigned 8 bit subset for a given packet. In operation, for each respective logic block 410, respective comparator logic 422 effects a logical AND of a respective 8 bits of the current byte with the 8 bits stored in the respective MaskRAM 426 for statement (1). Then for each respective logic block 410, the respective comparator logic 422 compares the respective 8 bits resulting from the respective logical AND operation with the 8 bits stored in the respective PatternRAM 424, and if there is a match then a logical I value is provided to InputCondition logic 412 via respective lines 411.

Thus, for each statement, each of the four logic blocks performs both a mask operation and a pattern comparison operation on a different 8 bit subset of each 32 bit byte of an acquired packet. In other words, the four logic blocks perform mask and compare operations for the conditions set forth in each of the statements (1)–(8). Those skilled in the art will appreciate that each logic block 410 stores different masks and different patterns for each statement in order to effect the different evaluations called for by each of the eight different statements. The use of stored masks and stored patterns to perform the evaluations required by the eight different statements will be readily understood by those skilled in the art, and forms no part of the present invention and need not be described in detail herein.

For example, still referring to the above exemplary prioritization policy, during a first clock cycle respective 8 bit digital values will be retrieved from the respective MaskRAMs and from the respective PatternRAMs of the respective logic blocks 410 in order to evaluate the condition set forth in statement (1), i.e., whether an acquired packet has DA (destination address) "qrs". During a second clock cycle, for example, respective 8 bit digital values will be retrieved from the respective MaskRAMs and from the respective PatternRAMs of the respective logic blocks 410 in order to evaluate the condition set forth in statement (2), i.e., whether the acquired packet is an ipx advertisement protocol packet AND whether the packet is from server "123". During a third clock cycle, for example, respective 8 bit digital values will be retrieved from the respective MaskRAMs and from the respective PatternRAMs of the respective logic blocks in order to evaluate the condition set forth in statement (3), i.e., whether the acquired packet is an ip packet AND whether the packet is from node "xyz" to server "ABC" OR the packet is from node "xyz" to node "DEF". The evaluation, for example, may continue to proceed in this manner for statements (4)–(8) as well.

Thus, eight mask/pattern filters are applied to a given byte during each eight clock cycle interval. During a next eight clock cycle interval, the eight mask/pattern filters are applied to the next byte of the captured packet. This process continues for each byte in the packet. When the entire packet (all of its bytes) has been filtered, the output signals 423 of the ActionRAM 422 are considered to be valid and may be employed to initiate a desired action.

In essence, each different mask/pattern combination represents a different filter, and the mask/logical AND steps constitute the application of different filters to the captured digital information. Of course, there are different types of filters that could be applied in different electronic devices that embody the principles of the invention. For example, a filter may be "if A=B" variety where it would be a NAND condition.

It will be appreciated that the values stored in the MaskRAMs and the PatternRAMs for a given filter may change from one byte of a packet to the next. Furthermore, only a few bytes of a given packet may be of interest to a given filter, and the values stored in the MaskRAMs and the PatternRAMs may reflect that fact. For example, in the first prioritization sample above, the first condition (1) tests for whether a DA (destination address) is node "qrs". A DA spans six bytes in an Ethernet packet. Hence, the entire six byte wide destination address spans six different 8 bit subsets for each logic block. The PatternRAMs and the MaskRAMs, therefore, store six different 8 bit subsets for each of the four logic blocks. Once those six bytes have been tested, however, the values of the remaining bytes of the packet are irrelevant to condition (1), and the MaskRAMs and PatternRAMs are loaded with values (typically all O's) which effect this "don't care" status.

Note that the order in which conditions are evaluated is unimportant to the practice of the invention. In other words, the ordering of conditions and actions in the prioritization policy does not dictate the order in which evaluations actually are performed by the logic blocks 410. Thus, for instance, the condition set forth in statement (7) could be evaluated before the condition in statements (1), (2) or (3).

The InputCondition logic 412 serves to accumulate the results of the byte-by-byte processing for each address line 416. For example, referring again to the first condition (1) in the first prioritization sample, during filtering of the six DA bytes, a logical "one" is sustained on address line "0" for as long as the condition (1) filter suggests a match (i.e., DA="qrs"). However, if any byte in the six DA bytes does not match, then a logical "zero" is provided to line "0", and logical "zero" is sustained on line "0" during the filtering of the remaining bytes regardless of whether or not there is a match with a later byte in the packet. For the non-DA bytes (i.e., the bytes following the first six bytes), the MaskRAM and PatternRAM store values that cause the InputCondition logic 412 to perceive a match regardless of whether or not a match actually occurs. Hence, the "don't care" bytes do not change the address line "0" value set by comparisons of the six DA bytes.

In the present embodiment, the values used by the MaskRAMs, PatternRAMs and ActionRAM for a given prioritization all are stored on a single page in SRAM. The filters and the ActionRAM contents may be changed from time to time. The output lines 423 of the ActionRAM 414 provide three bits used to address the page of memories MaskRAM, PatternRAM and ActionRAM in which the next eight filters to be employed by the MaskRAM and the PatternRAM and the next ActionRAM values to be employed in the next prioritization policy are stored. These three bits, can be used to address eight different pages in memory. In the present embodiments, each page contains values for eight filters and for a corresponding ActionRAM. The output lines 422 of the ActionRAM 414 also provide one bit to signal whether to keep or discard a packet. The lines 422 also provide three bits used to increment counters which, for example, can be used to count the number of packets addressed to node "xyz", to node "qrs" and to count the number of ipx packets. In the current embodiment, the lines 422 also provide a trigger bit to trigger a prescribed event such as: capture the next 1Mbytes of data; then shut down. It will be understood that the actions performed in response to signals provided on lines 422 may vary depending upon the filters and the application of the network protocol analyzer 400.

Therefore, the network protocol analyzer 400 of the presently preferred embodiment advantageously implements a prioritization policy by merely accessing a memory device 414 encoded with a collection of digital values representative of actions to be performed in accordance with different outcomes of the evaluation of multiple prioritized conditions. The novel analyzer 400 accesses the memory device 414 using address signal combinations in which individual bit positions in the combination represent the outcome of the evaluation of an individual condition in the prioritization policy. The complete combination of address signals collectively represents the status of multiple conditions relevant to the prioritization policy. Hence the new analyzer 400 can implement a prioritization policy based upon the outcome of the evaluation of multiple conditions by accessing an appropriate digital value previously stored in the memory device 414. The analyzer 400, therefore, can reduce the processor cycles which otherwise might be required to implement such a prioritization policy based upon such multiple evaluations using "if-then-else" statements.

It will be appreciated that although a network protocol analyzer in accordance with the invention has been disclosed in terms of a preferred embodiment implemented with a PC, the invention may be practiced using other implementations. For example, the invention may be implemented as a standalone unit with a built-in CPU. Moreover, although the network protocol analyzer of the presently preferred embodiment is targeted to Ethernet networks, those skilled in the art will appreciate that the invention is applicable to other network environments as well, such as internet working and network firewalls, for instance.

While particular embodiments of the invention have been illustrated and described in detail herein, it will be appreciated that various modifications to the preferred embodiments can be made without departing from the spirit and scope of the invention which is defined in the appended claims.

What is claimed is:

1. A method of encoding an electronic memory comprising the steps of:
   providing multiple digital values;
   prioritizing the digital values;
   associating respective digital values with respective memory locations of the electronic memory such that there are multiple memory locations each associated with two or more different digital values; and
   loading respective digital values into respective memory locations of the electronic memory in order from lowest priority digital value to highest priority digital value wherein each respective digital value is loaded into all respective memory locations that are associated with such respective digital value.

2. A method of encoding an electronic memory comprising the steps of:
   providing multiple digital values;
   identifying multiple test conditions;
   associating respective digital values with respective test conditions;
   prioritizing the respective digital values and associated test conditions;
   associating respective digital values with respective memory locations of the electronic memory such that there are multiple memory locations each associated with two or more different digital values; and
   loading respective digital values into respective memory locations of the electronic memory in order from lowest priority digital value to highest priority digital value wherein each respective digital value is loaded into all respective memory locations that are associated with such respective digital value.

3. A method of encoding an electronic memory which includes memory locations addressable via address signal lines, comprising the steps of:
   providing multiple digital values;
   prioritizing the digital values;
   associating respective digital values with respective address signal lines; and
   loading respective digital values into respective memory locations of the electronic memory in order from lowest priority digital value to highest priority digital value wherein each respective digital value is loaded into all respective memory locations that are addressable through application of a prescribed address signal value to a respective address signal line associated with such respective digital value.

4. A method of encoding an electronic memory which includes memory locations addressable via address signal lines, comprising the steps of:
   providing multiple digital values;
   identifying multiple test conditions;
   associating respective digital values with respective test conditions;
   prioritizing the respective digital values and associated test conditions;
   associating respective digital values and associated test conditions with respective address signal lines; and
   loading respective digital values into respective memory locations of the electronic memory in order from lowest priority digital value to highest priority digital value
wherein each respective digital value is loaded into all
respective memory locations that are addressable
through application of a prescribed address signal value
to a respective address signal line associated with such
respective digital value.

5. The method of claim 3 wherein the prescribed digital address signal value is logical 1.

6. The method of claim 4 wherein the prescribed digital address signal value is logical 1.

7. The method of claim 3 wherein the prescribed digital address signal value is logical 0.

8. The method of claim 4 wherein the prescribed digital address signal value is logical 0.

9. An electronic memory encoded according to the process of claim 1.

10. An electronic memory encoded according to the process of claim 2.

11. An electronic memory encoded according to the process of claim 3.

12. An electronic memory encoded according to the process of claim 4.

13. A method of encoding an electronic memory which includes memory locations i=0 to i=$2^N$−1 with digital values Action$_{M+1}$ to Action$_1$, based upon the priority of condition$_M$ to condition$_1$, wherein Actionj corresponds to conditionj, for j=M to j=1, comprising the steps of:

```
for i = 0 to 2^N − 1 do
    begin
    memory location(i) = Action_{M+1}
    for j = M down to 1 do
        if (evaluate(i, conditionj) is equal to true) then memory
        location(i)
        = Actionj
        end
    end.
```

14. An electronic memory encoded according to the process of claim 13.

15. A method using a memory medium to implement a prioritization policy, comprising the steps of:

providing multiple digital values;

identifying multiple test conditions;

associating respective digital values with respective test conditions;

prioritizing the respective digital values and associated test conditions;

associating respective digital values and associated test conditions with respective memory locations of the electronic memory;

loading respective digital values into respective memory locations of the memory medium in order from lowest priority digital value to highest priority digital value wherein each respective digital value is loaded into all respective memory locations that are associated with such respective digital value;

individually evaluating the test conditions;

providing multiple electronic signals which together indicate the highest priority test condition satisfied according to the step of evaluating; and accessing a respective memory location of the memory medium having a respective digital value associated with the indicated highest priority test condition.

16. A method using a memory medium to implement a prioritization policy, comprising the steps of:

providing multiple digital values;

identifying multiple test conditions;

associating respective digital values with respective test conditions;

prioritizing the respective digital values and associated test conditions;

associating respective digital values and associated test conditions with respective memory locations of the memory medium such that there are multiple memory locations each associated with two or more different digital values;

loading respective digital values into respective memory locations of the electronic memory in order from lowest priority digital value to highest priority digital value wherein each respective digital value is loaded into all respective memory locations that are associated with such respective digital value;

evaluating the test conditions individually to determine the individual states of different respective test conditions;

simultaneously producing multiple respective electronic test condition state signals which individually indicate respective states of different respective test conditions and which together indicate the highest priority test condition satisfied according to the step of evaluating; and accessing a respective memory location of the memory medium having a respective digital value associated with the indicated highest priority test condition.

17. The method of claim 16, wherein the multiple respective test condition state signals produced during said step of simultaneously producing together constitute a respective digital address signal combination; and wherein said step of accessing involves applying the digital address signal combination to address a memory location of the memory medium that contains the indicated highest priority test condition.

18. A method using a memory medium which includes memory location addressable via address signal lines to implement a prioritization policy, comprising the steps of:

providing multiple digital values;

identifying multiple test conditions;

associating respective digital values with respective test conditions;

prioritizing the respective digital values and associated test conditions;

associating respective digital values and associated test conditions with respective address signal lines; and loading respective digital values into respective memory locations of the electronic memory in order from lowest priority digital value to highest priority digital value wherein each respective digital value is loaded into all respective memory locations that are addressable through application of a prescribed address signal value to a respective address signal line associated with such respective digital value;

evaluating the test conditions individually to determine the individual states of different respective test conditions;

producing a digital address signal combination in which individual signals indicate respective states of different respective test conditions; and addressing a respective memory location of the memory medium using the produced address signal combination.

19. The method of claim 18 wherein the prescribed digital address signal value is logical 1.

20. The method of claim 18 wherein the prescribed digital address signal value is logical 0.

21. A network protocol analyzer comprising:

a network controller;

electronic memory that includes memory locations addressable via address signal lines, and that has been encoded in accordance with the method of claim 4;

electronic memory storing respective digital mask information for each respective test condition;

electronic memory storing respective digital pattern information for each respective test condition;

test circuitry that respectively applies respective digital mask information and respective digital pattern information to respective captured digital network information and that produces multiple respective individual digital test condition state signals, each of which indicates a respective state of a different respective test condition in relation to the respective captured digital network information; and addressing circuitry that produces an address signal combination in which individual respective address signal bits are associated with individual respective digital test condition state signals produced by said test circuitry and that applies each respective individual address bit to a respective address signal line associated with a test condition corresponding to a respective digital test condition state signal associated with such bit.

22. The network protocol analyzer of claim 21 wherein said test circuitry includes comparison circuitry.

23. The network protocol analyzer of claim 21 wherein said test circuitry includes a programmable logic device.

24. The network protocol analyzer of claim 21 wherein said test circuitry includes comparison circuitry implemented in a programmable logic device.

25. The network protocol analyzer of claim 21, wherein the respective multiple digital values encoded in said electronic memory identify other memory locations of said electronic memory encoded, according to the process of claim 4, with other multiple digital values.

26. The network protocol analyzer of claim 21, wherein the multiple digital values and the respective digital mask information for each respective test condition and the respective digital pattern information for each respective test condition all are stored on a same page in electronic memory.

27. The network protocol analyzer of claim 21, wherein the multiple digital values and the respective digital mask information for each respective test condition and the respective digital pattern information for each respective test condition all are stored in a same page in electronic memory; and wherein respective digital values stored in the page of electronic memory identify another page of electronic memory which contains different multiple digital values and corresponding different digital mask information and corresponding different digital pattern information.

28. The network protocol analyzer of claim 21, further including:

a computer including bus circuitry; and buffer memory coupled to receive digital network information captured by said network controller and to provide such captured digital network information to said bus circuitry.

29. The network protocol analyzer of claim 21, further including:

a computer; and buffer memory coupled to receive digital network information captured by said network controller and to provide such captured digital network information to said computer;

wherein said test circuitry is coupled to receive digital network information from said network controller.

30. An electronic system comprising:

capture means for capturing digital information;

electronic memory encoded in accordance with the method of claim 2; and test condition means for performing multiple tests of the captured information to determine which ones of the multiple test conditions are satisfied by said captured information and for producing a multiple bit digital signal that simultaneously indicates which test conditions are satisfied and which test conditions are not satisfied and for providing such multiple bit signal to the electronic memory as an address signal combination which accesses a memory location of the electronic memory that stores a highest priority test condition determined by said test condition means to be satisfied by the captured information.

31. In an electronic system for analyzing digital information captured from a source, the improvement comprising:

electronic memory encoded according to the method of claim 2;

pattern memory means for storing a respective individual digital pattern for each respective test condition;

mask memory means for storing a respective individual digital mask for each respective test condition;

logic means for applying each respective individual digital mask to the captured information so as to produce a respective individual mask result for each respective test condition;

logic means for comparing each respective individual mask result with a respective corresponding individual digital pattern so as to produce a test condition bit value for each respective test condition; and address signal producing means for producing a multiple bit address signal that simultaneously indicates which test conditions are satisfied and which test conditions are not satisfied and which addresses a memory location that stores a digital value associated with a highest priority test condition satisfied by the captured information.

32. A method for selectively capturing digital information from a source, comprising the steps of providing multiple digital values;

identifying multiple test conditions;

associating respective digital values with respective test conditions;

prioritizing the respective digital values and associated test conditions;

associating respective digital values with respective memory locations of the electronic memory such that there are multiple memory locations each associated with two or more different digital values;

loading respective digital values into respective memory locations of the electronic memory in order from lowest priority digital value to highest priority digital value wherein each respective digital value is loaded into all respective memory locations that are associated with such respective digital value;

performing multiple tests of the captured information to determine which ones of the multiple test conditions are satisfied by said captured information;

producing a multiple bit digital signal that simultaneously indicates which test conditions are satisfied and which test conditions are not satisfied;

providing such multiple bit signal to the electronic memory as an address signal combination which accesses a memory location of the electronic memory that stores a highest priority test condition satisfied by the captured information.

33. A method for selectively capturing digital information captured from a source, comprising the steps of:

providing multiple digital values;

identifying multiple test conditions;

associating respective digital values with respective test conditions;

prioritizing the respective digital values and associated test conditions;

associating respective digital values with respective memory locations of the electronic memory such that there are multiple memory locations each associated with two or more different digital values;

loading respective digital values into respective memory locations of the electronic memory in order from lowest priority digital value to highest priority digital value wherein each respective digital value is loaded into all respective memory locations that are associated with such respective digital value;

providing a filter which provides respective the respective test conditions;

applying the filter to the captured information; and producing a multiple bit address signal that simultaneously indicates which respective test conditions are satisfied by the captured information and which respective test conditions are not satisfied by the captured information and that addresses a memory location which stores a digital value associated with a respective highest priority test condition that is satisfied by the captured information.

34. The method of claim 33 wherein, said step of providing a filter includes storing a respective individual digital pattern for each respective test condition and storing a respective individual digital mask for each respective test condition; and said step of applying a filter includes applying each respective individual digital mask to the captured information so as to produce a respective individual mask result for each respective test condition and comparing each respective individual mask result with a respective corresponding individual digital pattern so as to produce a test condition bit value for each respective test condition.

* * * * *